United States Patent [19]

Kawasaki

[11] Patent Number: 5,710,663
[45] Date of Patent: Jan. 20, 1998

[54] REFLECTING FLUORESCENCE MICROSCOPE

[75] Inventor: Kenji Kawasaki, Musashimurayama, Japan

[73] Assignee: Olympus Optical Co., Ltd., Tokyo, Japan

[21] Appl. No.: 653,267

[22] Filed: May 24, 1996

[30] Foreign Application Priority Data

May 25, 1995 [JP] Japan ................................. 7-126636

[51] Int. Cl.$^6$ ........................................... G02B 21/06
[52] U.S. Cl. .................. 359/389; 359/368; 359/385; 359/590
[58] Field of Search ............................ 359/368–390, 359/885–891, 588–590

[56] References Cited

U.S. PATENT DOCUMENTS

| | | | |
|---|---|---|---|
| 3,973,827 | 8/1976 | Uetake | 359/389 |
| 5,164,858 | 11/1992 | Aguilera, Jr. et al. | 359/590 |
| 5,214,494 | 5/1993 | Inaba et al. | 359/590 |
| 5,371,624 | 12/1994 | Nagano et al. | 359/389 |

FOREIGN PATENT DOCUMENTS

| | | |
|---|---|---|
| 59-189613 | 12/1984 | Japan. |
| 2-114402 | 4/1990 | Japan. |
| 6-331894 | 12/1994 | Japan. |
| WO 92/02839 | 2/1992 | WIPO ............................ 359/389 |

*Primary Examiner*—Thong Nguyen
*Attorney, Agent, or Firm*—Cushman, Darby & Cushman IP Group of Pillsbury, Madison & Sutro LLP

[57] ABSTRACT

A reflecting fluorescence microscope includes an excitation filter for converting a beam of light projected from a reflecting illumination light source into light having a plurality of wavelength regions of narrow-band excitation light, a dichroic mirror for irradiating a specimen with the light having a plurality of wavelength regions of narrow-band excitation light converted by the excitation filter to transmit various kinds of fluorescent light emitted from the specimen, and an absorption filter for absorbing an unwanted wavelength region from the light transmitted through the dichroic mirror to transmit the wavelength of a fluorescent image. In this reflecting fluorescence microscope, at least one band-stop filter having at least one absorption band is disposed in a reflecting illumination optical path before the dichroic mirror so as to absorb the wavelengths of a transmission band and change the amount of the light having a plurality of wavelength regions of narrow-band excitation light. Thus, the fluorescent image which is easy to observe can be obtained.

4 Claims, 9 Drawing Sheets

INCIDENT ANGLE 0°

FIG. 3C

INCIDENT ANGLE 45°

INCIDENT ANGLE 0°

FIG. 6C

INCIDENT ANGLE 45°

INCIDENT ANGLE 0°

FIG. 8C

INCIDENT ANGLE 45°

— DAPI-FITC-TRITC EXCITATION FILTER
—·— DAPI-FITC-TRITC ABSORPTION FILTER
——— DAPI-FITC-TRITC DICHROIC MIRROR

FIG. 10B

——— DAPI-FITC-TRITC EXCITATION FILTER
------- EXCITATION-LIGHT ADJUSTING FILTER 5,710,663

REFLECTING FLUORESCENCE MICROSCOPE

BACKGROUND OF THE INVENTION

1. Field of the Invention

This invention relates to a reflecting fluorescence microscope which is utilized to observe living tissue in the fields of medicine, biology, and the like, and in particular, to a reflecting fluorescence microscope which is capable of adjusting the intensities of various kinds of fluorescent light originating from a specimen.

2. Description of Related Art

In general, reflecting fluorescence microscopes of this type are used to detect a protein, a gene, and the like to which a fluorescent mark is applied on a living tissue or cell in medicine, biology, and other fields. In recent years, reflecting fluorescence microscopes have come into prominent use in order to study particularly the mutual positional relationship among specific substances, although they emit only faint fluorescent light, by multiple staining with a plurality of fluorescent marks.

In the past, where such a reflecting fluorescence microscope was used to observe a fluorescent specimen with multiple staining, observations were made by replacing a fluorescent filter set (including an excitation filter, a dichroic mirror, an absorption filter, etc.) for observing only a single fluorochrome with another according to the kind of fluorochrome. Hence, in order to determine the mutual positional relationship among fluorochromes, it is necessary that respective fluorescent images of the specimen are recorded on photographs or in a video memory for display in a multiple manner.

Not only does the conventional reflecting fluorescence microscope require long hours for the replacement of fluorescent filter sets, but also it is unsuitable for the detection, for example, of fluorochromes having high discoloration speeds or of the mutual positional relationship among the fluorochromes as a function of time. Moreover, the conventional observation technique has encountered problems that if parts of the dichroic mirror and the absorption filter are of low accuracy, decentering of an observation optical system may be caused by the replacement of fluorescent filter sets and an error will be produced in the mutual positional relationship detected from the fluorescent image.

Thus, a fluorescent filter set which is capable of addressing such problems has been used recently. This fluorescent filter set includes an excitation filter having two high-transmittance regions $\lambda_{EA}$ and $\lambda_{EB}$ for effectively exciting two kinds of fluorochromes A and B, a dichroic mirror having two high-transmittance regions between the two regions $\lambda_{EA}$ and $\lambda_{EB}$ and on the long-wavelength side of the region $\lambda_{EB}$, and an absorption filter, so that the fluorochromes A and B can be observed at the same time.

Another fluorescent filter set is also used in which three kinds of fluorochromes A, B, and C can be observed at the same time. This fluorescent filter set is composed of a triple excitation filter having three high-transmittance regions $\lambda_{EC}$, $\lambda_{ED}$, and $\lambda_{EE}$ for effectively exciting three kinds of fluorochromes A, B, and C, a dichroic mirror, and an absorption filter.

Since the intensity of fluorescent light varies with fluorochrome, it has been said to be difficult to balance two kinds of fluorochromes so that a desired brightness is secured. As means for controlling the intensities of fluorescent light of two kinds of fluorochromes, for example, there are fluorescent-light cut means for changing the properties of the absorption filter placed in the observation optical path or inserting an auxiliary filter in the observation optical path to partially block the fluorescent light emitted from the specimen, and light-intensity controlling means for adjusting the intensity of illumination light by inserting an ND filter with neutral density, which does not exhibit spectral selective absorption, in the illumination optical path or by adjusting an aperture stop.

With the fluorescent-light cut means of the former, however, excitation light exciting the blocked part of the fluorescent light is of no use, with the result that the efficiency of use of the fluorescent light is lowered accordingly and extra damage is caused to the specimen. With the light-intensity controlling means of the latter, on the other hand, the intensities of excitation light of two wavelengths cannot be separately adjusted, and thus an intensity ratio between two kinds of fluorescent light cannot be changed.

If the fluorescent filter set for multiple excitation is used, the problem of producing the decentering of the observation optical system can be solved. However, where there is a difference between the intensities of fluorescent light or between the discoloration speeds of fluorochromes, it is difficult to adjust the intensities of two or more kinds of fluorescent light to a desired brightness. Consequently, in photography and observation, one fluorescent image sometimes becomes extremely bright or conversely, dark.

In order to overcome this problem, for example, Japanese Patent Preliminary Publication No. Hei 5-150164 proposes that a wavelength shift filter of band-pass type having transmission characteristics between two excitation-light bands is placed in the illumination optical path. This wavelength shift filter, composed of an interference filter, is inclined at a proper angle with respect to the reflecting illumination optical axis to shift a transmission band. Alternatively, for the wavelengths of two of various kinds of narrow-band excitation light, a filter is selected which has a high transmittance of the narrow-band excitation light on either the short-wavelength or long-wavelength side, and is removably placed in the reflecting illumination optical path to thereby adjust the intensity of transmitted light. In this way, the intensities of two of the various kinds of narrow-band excitation light are adjusted, so that the intensities of two fluorescent images can be effectively adjusted.

Further, Japanese Patent Preliminary Publication No. Hei 6-331894 offers the microscope optical system in which a plurality of dichroic mirrors are arranged to provide a plurality of optical paths for separately adjusting the amounts of excitation light. In order to collect the excitation light into one beam of light after the adjustment of the amounts of excitation light, light-collecting dichroic mirrors are arranged, through which convergent light is introduced into the reflecting illumination optical path.

Still further, Japanese Patent Preliminary Publication No. Hei 2-114402 is such that a band-pass filter for a single wavelength is disposed in the illumination optical path to be normal thereto and an interference filter is tiltably placed, thereby changing continuously the intensity of the single wavelength of the band-pass filter.

Although various solutions are proposed as mentioned above, the interference filter for adjusting the intensity of fluorescent light in Hei 5-150164 is merely capable of adjusting the intensities of fluorescent light of two of the various kinds of excitation light. Specifically, if the intensities of two of the various kinds of excitation light for at least triple excitation are adjusted by the interference filter, all the other excitation light will be blocked by the interference filter. Thus, the use of the interference filter of this type makes it impossible to adjust the intensity of excitation light for at least triple excitation.

Moreover, where two filters having different transmittances are selected and placed with respect to the wavelengths of two of various kinds of narrow-band excitation light, account is not taken of the intensities of at least three kinds of fluorescent light, and thus it is impossible to change the intensities of the corresponding fluorescent light at will.

The optical arrangement set forth in Hei 6-331894 includes the dichroic mirrors for separating respective excitation light from various kinds of narrow-band excitation light and filters for adjusting the intensity, with the result that the number of optical components is increased and the arrangement becomes complicated. Furthermore, loss of the excitation light becomes great, a fact which makes it difficult to efficiently excite the light.

Hei 2-114402 does not in any way suggest the properties of the band-pass filter. Moreover, for the same reason as in Hei 5-150164, the band-pass filter does not allow the intensity ratio among three or more kinds of fluorescent light to be adjusted and is merely capable of adjusting the intensity of the excitation light of a single wavelength.

SUMMARY OF THE INVENTION

It is, therefore, an object of the present invention to provide a reflecting fluorescence microscope in which a fluorescent filter set freed not be replaced with another, the intensities of fluorescent light emitted from fluorochromes can be changed in a simple operation with respect to a fluorescent specimen of at least triple staining, as well as of double staining, and a fluorescent image which is easy to observe can be efficiently obtained.

In order to achieve this object, the reflecting fluorescence microscope according to the present invention includes an excitation filter for converting a beam of light projected from a reflecting illumination light source into light having a plurality of wavelength regions of narrow-band excitation light, a dichroic mirror for irradiating the specimen with the light having a plurality of wavelength regions of narrow-band excitation light converted by the excitation filter to transmit various kinds of fluorescent light emitted from the specimen, and an absorption filter for absorbing the wavelengths of an unwanted wavelength region from the light transmitted through the dichroic mirror to transmit the wavelength of a fluorescent image. In the reflecting fluorescence microscope, at least one band-stop filter having at least one absorption band of wavelength is placed in a reflecting illumination optical path before the dichroic mirror so as to absorb the wavelengths of the transmission band and change the amount of the light having a plurality of wavelength regions of narrow-band excitation light.

If the absorption band of the band-stop filter exists in part of the plurality of wavelength regions of narrow-band excitation light, part of the narrow-band excitation light will be absorbed, and thereby the intensity of the excitation light will be changed. The other narrow-band excitation light is not blocked because the band-stop filter has a high transmittance. Moreover, if a band-stop filter having the absorption band in part of the other wavelength regions of narrow-band excitation light is placed in the reflecting illumination optical path, the intensity of the narrow-band excitation light can likewise be adjusted. Hence, by adjusting the intensity ratio among various kinds of narrow-band excitation light, the intensity ratio among various kinds of fluorescent light emitted form the specimen can be efficiently adjusted.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Before undertaking the description of the embodiments, it will be expedient to explain the function of the reflecting fluorescence microscope of the present invention.

According to one aspect of the present invention, the band-stop filter is obliquely placed in the reflecting illumination optical path, so as to change from the state where the filter cuts off the wavelengths of the wavelength region of narrow-band excitation light on the short-wavelength side, of two adjacent wavelength regions among a plurality of wavelength regions of narrow-band excitation light or has a partially low transmittance in the above wavelength region and a high transmittance in the wavelength region of narrow-band excitation light on the long-wavelength side to the state where it has a high transmittance in the wavelength region of narrow-band excitation light on the short-wavelength side and cuts off the wavelengths of the wavelength region of narrow-band excitation light on the long-wavelength side or has a partially low transmittance in this region. In this way, the band-stop filter is constructed with an interference filter for shifting the transmission band of wavelength. The band-stop filter, which is the interference filter, is inclined at a proper angle and disposed in the reflecting illumination optical path, thereby changing the angle of incidence of the excitation light entering the band-stop filter.

The maximum wavelength of transmission wavelength is defined as λ, the optical thickness of a dielectric as t (including a phase difference produced at the interface of the dielectric, in terms of an optical path length), and as Φ. The angle of refraction at the interface, the interference condition of the interference filter can in general be expressed by $$2t \cos \Phi = m\lambda \quad (1)$$

Here, when an order m is made constant and the interference condition is also made constant, the wavelength λ is proportional to cos Φ. Since the angle of refraction Φ is conjugate with the angle of incidence according to Snell's law, both are considered equivalent. Thus, as is obvious from Eq. (1), cos Φ decreases with increasing angle of incidence and at the same time, the wavelength λ also decreases, so that the position of the maximum transmittance is gradually shifted to the short-wavelength side. Hence, when the band-stop filter is gradually inclined from an axis perpendicular to the optical path up to 45°, the absorption band is shifted from the long-wavelength side to the short-wavelength side.

Specifically, when the angle of incidence is made to approach 0° (the band-stop filter is made normal to the optical path), the absorption band of the band-stop filter is gradually shifted to the long-wavelength side and is superimposed on the wavelength region of narrow-band excitation light on the long-wavelength side, of two adjacent wavelength regions among the plurality of wavelength regions of narrow-band excitation light. Consequently, the intensity of the narrow-band excitation light on the long-wavelength side is decreased, and when the absorption band of the band-stop filter coincides with the wavelength region of narrow-band excitation light on the long-wavelength side, the narrow-band excitation light on the long-wavelength side is blocked.

Conversely, when the angle of incidence is made to approach 45°, the absorption band of the band-stop filter is gradually shifted to the short-wavelength side and is superimposed on the wavelength region of narrow-band excitation light on the short-wavelength side, of two adjacent wavelength regions among the plurality of wavelength regions of narrow-band excitation light. Consequently, the intensity of the narrow-band excitation light on the short-wavelength side is decreased, and when the absorption band of the band-stop filter coincides with the wavelength region of narrow-band excitation light on the short-wavelength side, the narrow-band excitation light on the short-wavelength side is blocked.

Since the band-stop filter has the absorption band only between two adjacent regions of the narrow-band excitation light and a high transmittance in the wavelength region of narrow-band excitation light on the long-wavelength side, the other narrow-band excitation light is not blocked.

Moreover, a band-stop filter having the absorption band between other two adjacent regions of the narrow-band excitation light is inclined at a proper angle with respect to the reflecting illumination optical path, thereby adjusting the intensity ratio of the narrow-band excitation light in the two adjacent regions.

In this way, the intensity ratio among various kinds of narrow-band excitation light is adjusted, and thereby the intensity ratio among various kinds of fluorescent light emitted from the specimen can be efficiently adjusted.

According to another aspect of the present invention, a band-pass filter is placed in the reflecting illumination optical path ahead of the dichroic mirror. This band-pass filter is composed of a single interference filter which has a high transmittance between the wavelength regions of narrow-band excitation light on the longest- and shortest-wavelength sides, of a plurality of wavelength regions of narrow-band excitation light. Furthermore, the band-pass filter is inclined and disposed in the reflecting illumination optical path, so as to change from the state where the filter cuts off the wavelengths of the wavelength region of narrow-band excitation light on the shortest-wavelength side and has a high transmittance in the wavelength region of narrow-band excitation light on the longest-wavelength side to the state where it cuts off the wavelengths of the transmission band on the longest-wavelength side and has a high transmittance in the wavelength region of narrow-band excitation light on the shortest-wavelength side. In this way, the band-pass filter shifts the transmission band in wavelength.

The band-pass filter is constructed with the interference filter, and thus when the angle of incidence is changed from 0° to 45°, the transmission band of the band-pass filter is shifted from the long-wavelength side to the short-wavelength side.

Specifically, when the angle of incidence is made to approach 0°, the transmission band of the band-pass filter is shifted to the long-wavelength side and is gradually superimposed on the non-transmission band of the band-pass filter from the short-wavelength side of the wavelength region of narrow-band excitation light on the shortest-wavelength side among a plurality of wavelength regions of narrow-band excitation light. Consequently, the intensity of the narrow-band excitation light on the shortest-wavelength side is decreased, and when the transmission band of the band-pass filter is completely superimposed on the non-transmission band thereof, the narrow-band excitation light on the short-wavelength side is blocked. In this case, the other narrow-band excitation light is not blocked because the transmittance of the band-pass filter is high.

Conversely, when the angle of incidence is made to approach 45°, the transmission band of the band-pass filter is shifted to the short-wavelength side and is gradually superimposed on the non-transmission hand of the band-pass filter from the long-wavelength side of the wavelength region of narrow-band excitation light on the longest-wavelength side, of the plurality of wavelength regions of narrow-band excitation light. Consequently, the intensity of the narrow-hand excitation light on the longest-wavelength side is decreased, and when the transmission hand of the hand-pass filter is completely superimposed on the non-transmission hand thereof, the narrow-band excitation light on the long-wavelength side is blocked. In this case, the other narrow-band excitation light is not blocked because the transmittance of the band-pass filter is high.

For the intensity adjustment of the narrow-band excitation light excluding the wavelength regions of narrow-band excitation light on the longest- and shortest-wavelength sides, the band-stop filter having the absorption band between two adjacent wavelength regions of the narrow-band excitation light including that on the longest- and shortest-wavelength sides is inclined at a proper angle with respect to the reflecting illumination optical path, thereby adjusting the intensity ratio of the narrow-band excitation light in the two adjacent regions. When the band-stop filter and the band-pass filter are tiltably arranged independently in the reflecting illumination optical path, the intensity ratio among various kinds of narrow-band excitation light can be adjusted, and the intensity ratio among various kinds of fluorescent light can be efficiently adjusted.

In accordance with the drawings, the embodiments of the reflecting fluorescence microscope according to the present invention will be explained in detail below.

First Embodiment

Figure 1:
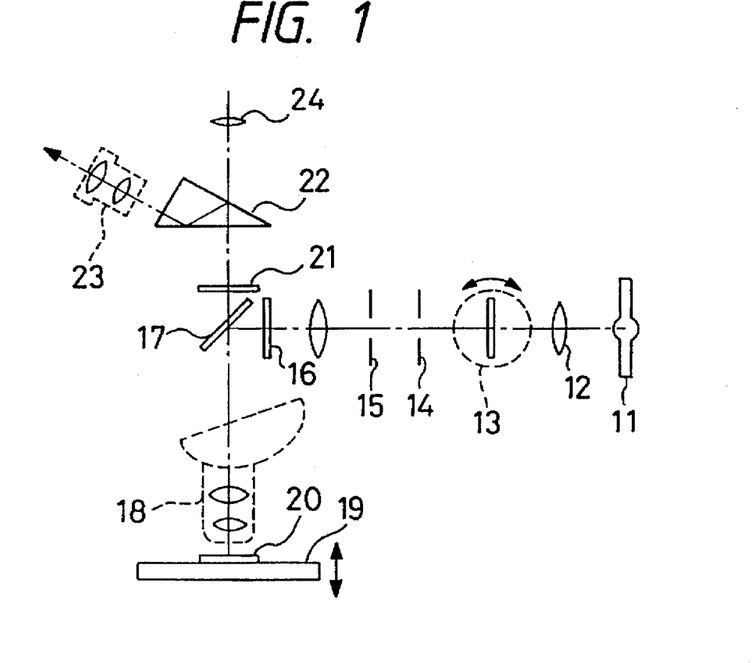
FIG. 1 is a view showing an optical arrangement of a first embodiment of the reflecting fluorescence microscope according to the present invention.

FIG. 1 shows the arrangement of the first embodiment of the reflecting fluorescence microscope according to the present invention. Light originating from a light source 11, such as a mercury lamp, is collected by a collector lens 12, and after passing through a band-stop filter 13, an aperture stop 14, and a field stop 15, traverses an excitation filter 16. The excitation filter 16 has transmittance characteristics such as those shown In FIG. 2. The light having traversed the excitation filter 16 is reflected by a dichroic mirror 17 and is radiated through an objective lens 18 on a specimen 20 placed on a stage 19. When the light is radiated on the specimen 20, various kinds of fluorescent light are emitted from the specimen 20. The fluorescent light is conducted through the objective lens 18 to the dichroic mirror 17. On the exit side of the dichroic mirror 17 are arranged an absorption filter 21 which has transmittance characteristics, such as those shown in FIG. 2, and a beam splitter 22 which serves to switch the optical path to either an observation system or a photographing system. The beam splitter is removably disposed on the optical path. An eyepiece optical system 23 is placed on the optical path of the observation system of the beam splitter 22, and a photographic eyepiece 24 is situated on the optical path of the photographing system thereof.

Figure 2:
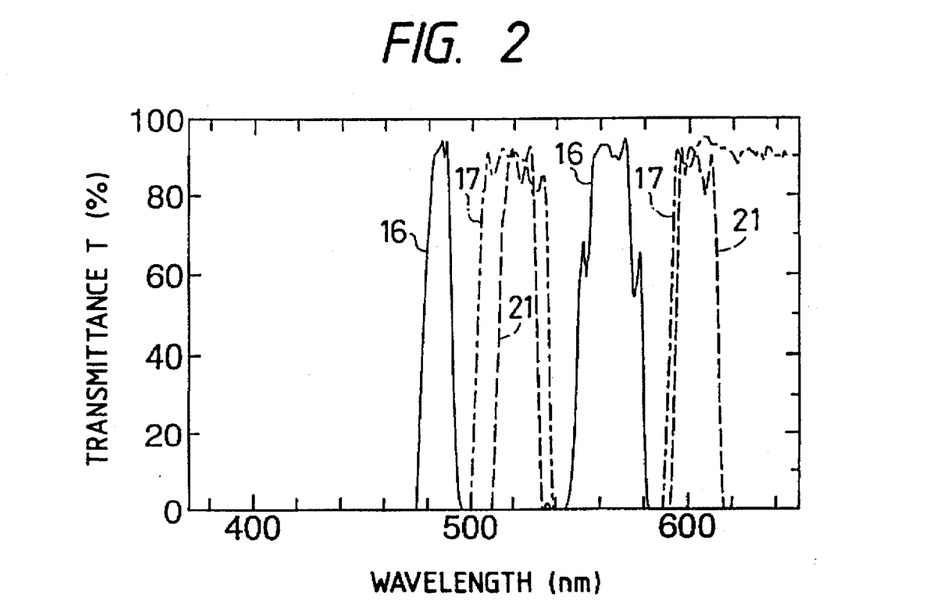
FIG. 2 is a graph showing the relationship between the wavelength and the transmittance in a fluorescent filter set for double excitation.

The reflecting fluorescence microscope of the first embodiment is directed to double excitation for observing two kinds of fluorescent light at the same time. The transmittance characteristics of the excitation filter 16, the dichroic mirror 17, and the absorption filter 21 are shown in FIG. 2. The band-stop filter 13 has the absorption band between adjacent wavelength regions $\lambda_{EA}$ and $\lambda_{EB}$ of the narrow-band excitation light and is tiltably disposed in the reflecting illumination optical path ahead of the dichroic mirror 17. The band-stop filter, which is an interference filter, possesses transmittance characteristics shown in FIG. 3A with respect to the excitation wavelength regions $\lambda_{EA}$ and $\lambda_{EB}$.

As mentioned above, the interference condition of the interference filter can be in general expressed by Eq. (1). Thus, when the interference filter is gradually inclined from the axis perpendicular to the optical path up to 45°, the transmittance band of wavelength can be continuously shifted, ranging from FIG. 3B to FIG. 3C.

Figure 3A:
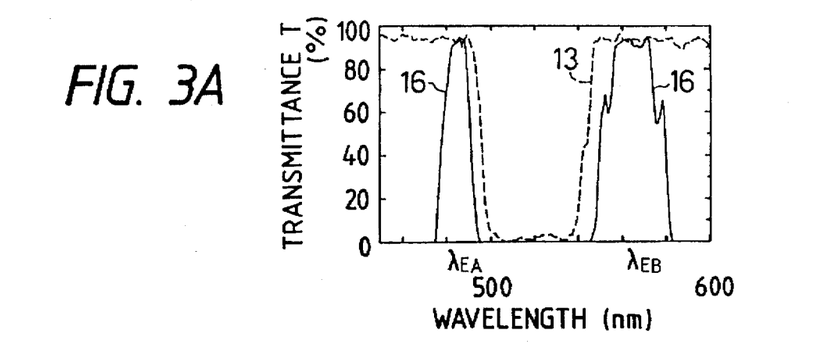
FIGS. 3A, 3B, 3C, and 3D are graphs showing the relationships between the wavelength and the transmittance in an excitation filter and a band-stop filter.
Figure 3B:
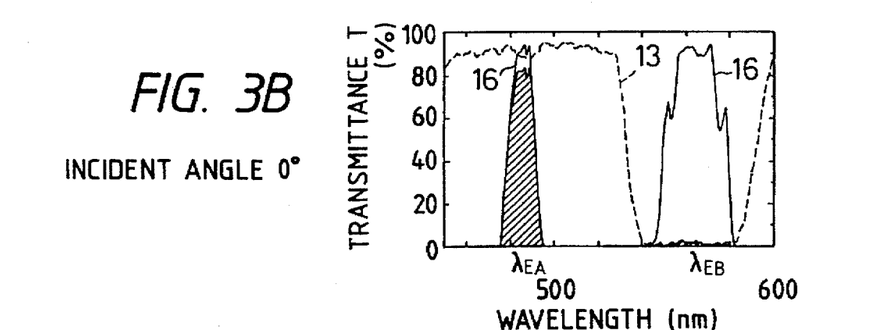
Figure 3C:
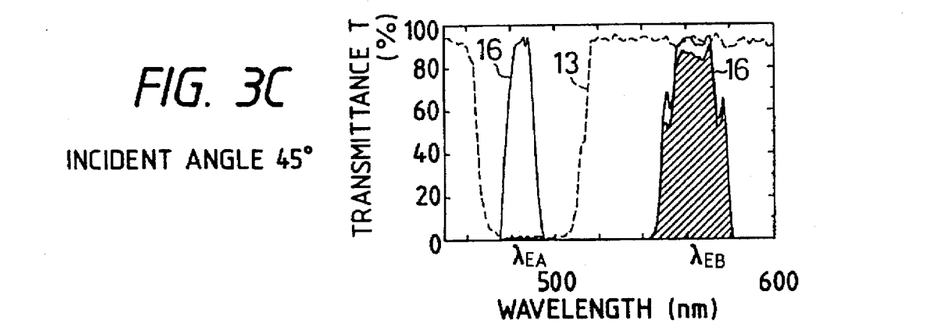

Hence, when the band-stop filter 13, having the characteristics shown in FIGS. 3A to 3C, is placed perpendicular to the reflecting illumination optical path (at an inclination angle of 0°) and is used in combination with the excitation filter 16, the resultant wavelength region of the excitation light is indicated by a hatching portion shown in FIG. 3B. As is evident from this figure, most wavelengths are cut in the wavelength region $\lambda_{EB}$ of excitation light on the long-wavelength side, of the excitation light derived from the excitation filter 16 because they are absorbed by the band-stop filter 13. On the other hand, the wavelength region $\lambda_{EA}$ of excitation light on the short-wavelength side does not undergo the influence of the band-stop filter 13, and thus the intensity ratio between the two wavelength regions $\lambda_{EA}$ and $\lambda_{EB}$ of the excitation light is changed. That is, the intensity ratio between two kinds of fluorescent light excited in the two wavelength regions $\lambda_{EA}$ and $\lambda_{EB}$ of the excitation light can be changed.

When the band-stop filter 13 inclined at 45° with respect to the reflecting illumination optical axis is combined with the excitation filter 16, the resultant wavelength region of the excitation light is indicated by the hatching portion shown in FIG. 3C. In this case, most wavelengths are cut in the wavelength region $\lambda_{EA}$ of excitation light on the short-wavelength side, of the excitation light derived from the excitation filter 16. On the other hand, the wavelength region $\lambda_{EB}$ of excitation light on the long-wavelength side does not undergo the influence of the band-stop filter 13, and thus the intensity ratio between the two wavelength regions $\lambda_{EA}$ and $\lambda_{EB}$ of the excitation light is changed. That is, the intensity ratio between two kinds of fluorescent light excited in the two wavelength regions $\lambda_{EA}$ and $\lambda_{EB}$ of the excitation light can be changed.

When the band-stop filter is inclined throughout the range of 0° to 45°, namely from the state of 0° shown in FIG. 3B toward the state of 45° shown in FIG. 3C, the absorption band of the band-stop filter 13 is shifted to the short-wavelength side in accordance with its angle of inclination. In this case, wavelengths to be cut in the wavelength region $\lambda_{EB}$ on the long-wavelength side are gradually decreased and the intensity of the excitation light is increased. In the wavelength region $\lambda_{EA}$ on the short-wavelength side, since it is superimposed on the absorption band of the band-stop filter 13, wavelengths gradually cut from the long-wavelength side are increased and the intensity of the excitation light is reduced accordingly.

Figure 3D:
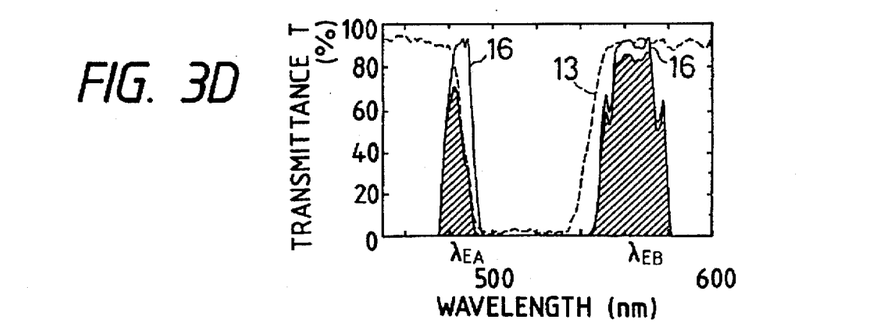

In the present invention, as is apparent from the above description, the intensity ratio between the wavelength regions $\lambda_{EA}$ and $\lambda_{EB}$ can be continuously changed, and hence the intensity ratio of two kinds of fluorescent light excited by the excitation light in the wavelength regions $\lambda_{EA}$ and $\lambda_{EB}$ can also be continuously changed. Specifically, if the angle of inclination of the band-stop filter relative to the reflecting illumination optical path is arbitrarily set between 0° and 45°, as shown in FIG. 3D, the intensity ratio between the two kinds of fluorescent light excited by the excitation light in the wavelength regions $\lambda_{EA}$ and $\lambda_{EB}$ can be adjusted to a desired brightness.

Second Embodiment

Figure 4:
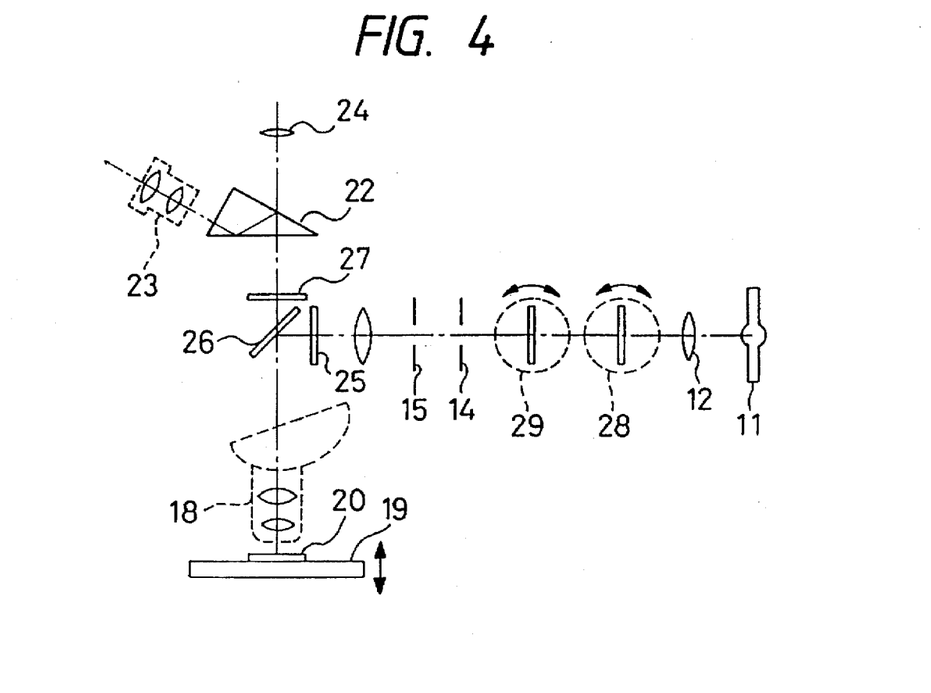
FIG. 4 is a view showing an optical arrangement of a second embodiment of the reflecting fluorescence microscope according to the present invention.
Figure 5:
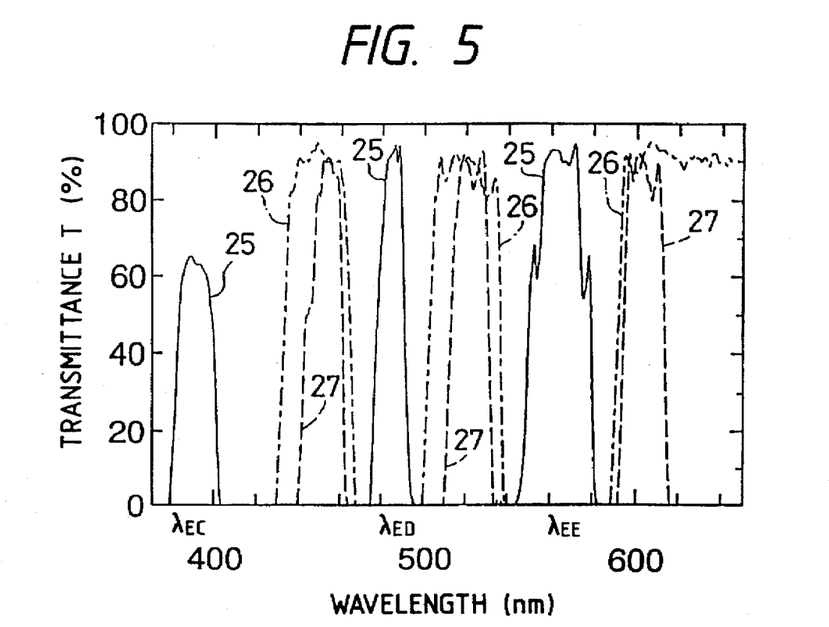
FIG. 5 is a graph showing the relationship between the wavelength and the transmittance in a fluorescent filter set for triple excitation.

FIG. 4 shows the arrangement of the second embodiment of the reflecting fluorescence microscope according to the present invention. The reflecting fluorescence microscope of this embodiment is directed to triple excitation for observing three kinds of fluorescent light at the same time. The second embodiment uses a triple excitation filter 25 instead of the excitation filter 16 in the first embodiment, a dichroic mirror 26 instead of the dichroic mirror 17, and an absorption filter 27 instead of the absorption filter 21. The triple excitation filter 25, the dichroic mirror 26, and the absorption filter 27 have transmittance characteristics such as those shown in FIG. 5.

Figure 6A:
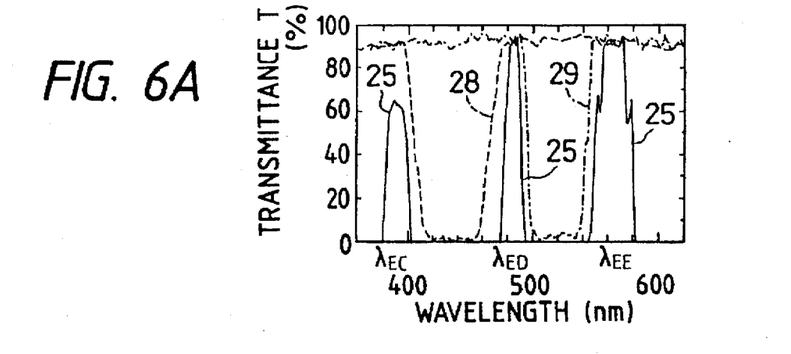
FIGS. 6A, 6B, 6C, and 6D are graphs showing the relationships between the wavelength and the transmittance in an excitation filter and two band-stop filters used in the second embodiment.

Moreover, the second embodiment is provided with, instead of the band-stop filter 13 in the first embodiment, a band-stop filter 28 having the absorption band between adjacent wavelength regions $\lambda_{EC}$ and $\lambda_{ED}$ of the narrow-band excitation light and a band-stop filter 29 having the absorption band between other adjacent wavelength regions $\lambda_{ED}$ and $\lambda_{EE}$ of the narrow-band excitation light. The band-stop filters 28 and 29 are juxtaposed to be separately tiltable in the reflecting illumination optical path before the dichroic mirror 26. Each of them is composed of an interference filter and has characteristics such as those shown in FIG. 6A with respect to wavelength regions $\lambda_{EC}$, $\lambda_{ED}$, and $\lambda_{EE}$. If the band-stop filters 28 and 29 are inclined at 0° or 45° to the vertical of the reflecting illumination optical path, their characteristics will change as shown in FIG. 6B or 6C.

Since the optical components of the second embodiment are the same as those of the first embodiment with the exception of the triple excitation filter 25, the dichroic mirror 26, the absorption filter 27, and the band-stop filters 28 and 29, reference numerals identical with those of the first embodiment (FIG. 1) are used in FIG. 4.

Figure 6B:
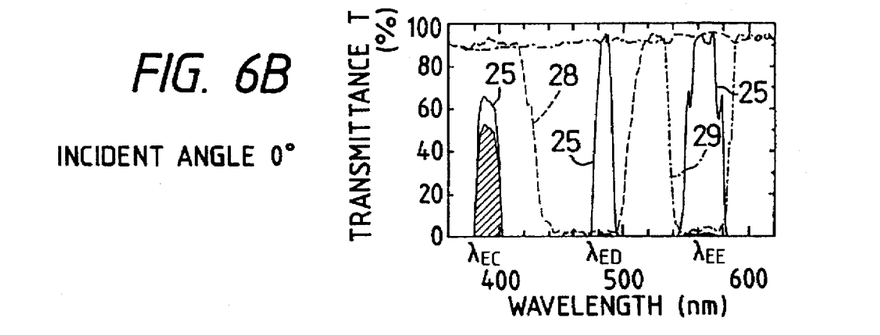
Figure 6C:
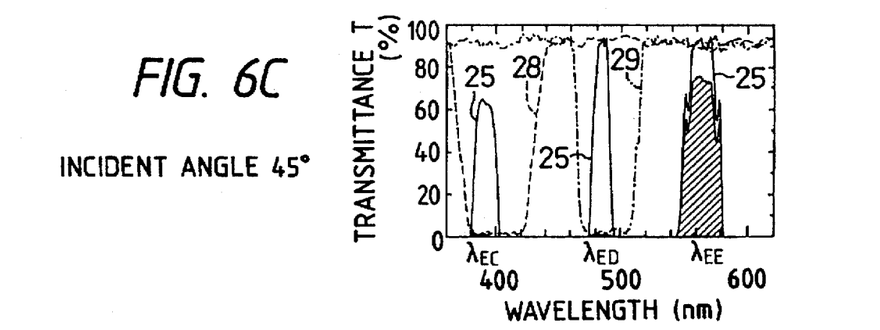
Figure 6D:
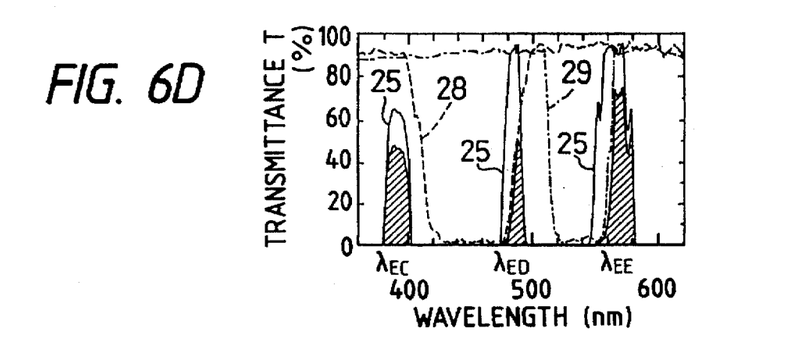

In the second embodiment, where the band-stop filters 28 and 29 are used in combination with the triple excitation filter 25, if the band-stop filters 28 and 29 are inclined in a direction perpendicular to the reflecting illumination optical axis (the angle of inclination=0°), the wavelength region of the excitation light becomes the hatching portion shown in FIG. 6B, and if they are inclined at 45°, the wavelength region becomes the hatching portion shown in FIG. 6C. Hence, if each of the band-stop filters 28 and 29 is set at an arbitrary angle between 0° and 45°, the intensity ratio of the excitation light in the wavelength regions $\lambda_{EC}$, $\lambda_{ED}$, and $\lambda_{EE}$ can be adjusted as shown in FIG. 6D. Since the band-stop filter 28 has a high transmittance in any region except for the wavelength regions $\lambda_{EC}$ and $\lambda_{ED}$, the excitation light in the wavelength region $\lambda_{EE}$ is not blocked. Similarly, the band-stop filter 29 has a high transmittance in any region except for the wavelength regions $\lambda_{ED}$ and $\lambda_{EE}$, and thus the excitation light in the wavelength region $\lambda_{EC}$ is not blocked. In this way, the intensity ratio of three kinds of fluorescent light excited by the excitation light in the regions $\lambda_{EC}$, $\lambda_{ED}$, and $\lambda_{EE}$ can be adjusted to secure a desired brightness.

Furthermore, the two band-stop filters 28 and 29 can be removably placed in the reflecting illumination optical path. If the ratio of intensity of the excitation light in two adjacent wavelength regions need not be adjusted, the band-stop filters 28 and 29 may be removed from the reflecting illumination optical path.

Even in the fluorescence observation of quadruple excitation, if three band-stop filters having absorption bands between adjacent wavelength regions $\lambda_{EF}$ and $\lambda_{EG}$ of the excitation light, between regions $\lambda_{EG}$ and $\lambda_{EH}$, and between regions $\lambda_{EH}$ and $\lambda_{EI}$, respectively, are arranged to be separately tiltable in the reflecting illumination optical path. In doing so, the intensity ratio of respective excitation light can be adjusted, and hence the intensity ratio among various kinds of fluorescent light excited can be adjusted. Even in the case of at least quintuple excitation, band-stop filters are likewise arranged, thereby adjusting the intensity ratio among various kinds of fluorescent light to obtain a desired brightness.

Third Embodiment

Figure 7:
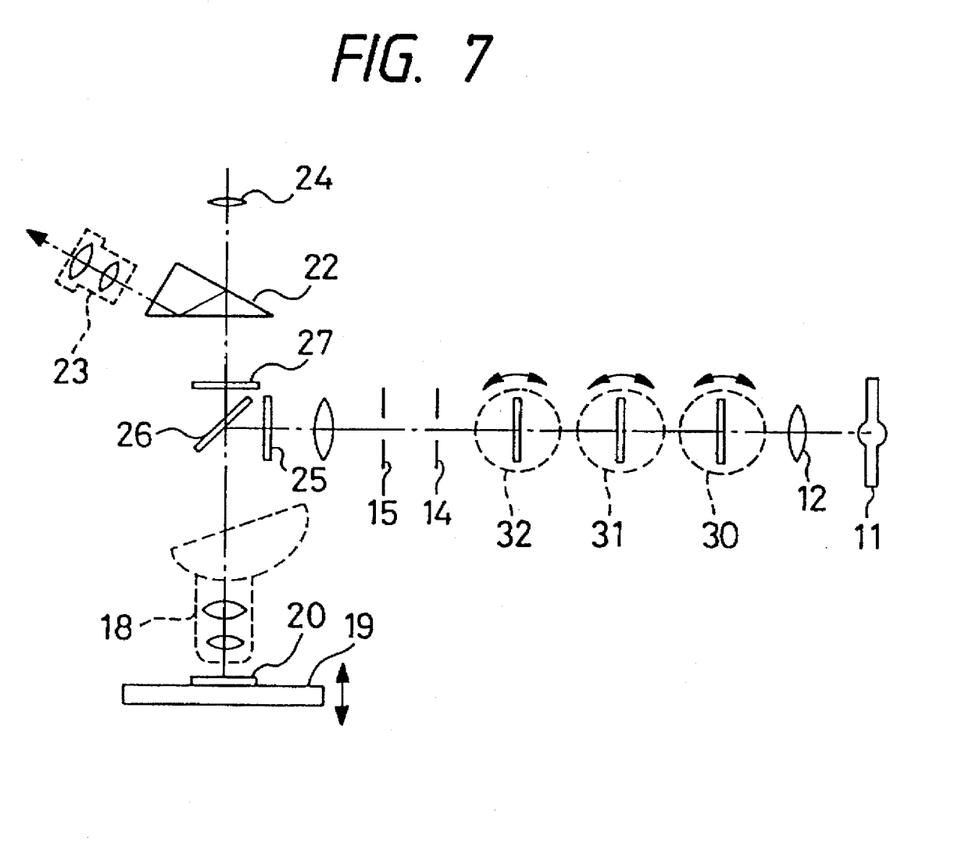
FIG. 7 is a view showing an optical arrangement of a third embodiment in the present invention.

FIG. 7 shows the arrangement of the third embodiment of the reflecting fluorescence microscope according to the present invention. The reflecting fluorescence microscope of the present invention is directed to triple excitation for observing three kinds of fluorescent light at the same time, and has a different arrangement from the second embodiment. The third embodiment is equipped with, instead of the band-stop filters 28 and 29 in the second embodiment, a band-pass filter 30 having a high transmittance which ranges from the wavelength region $\lambda_{EC}$ of narrow-band excitation light on the shortest-wavelength side to the wavelength region $\lambda_{EE}$ of narrow-band excitation light on the longest-wavelength side, a band-stop filter 31 having the absorption band between the wavelength regions $\lambda_{EC}$ and $\lambda_{ED}$ or between the wavelength regions $\lambda_{ED}$ and $\lambda_{EE}$, and a band-stop filter 32 having the absorption band between the wavelength regions $\lambda_{EC}$ and $\lambda_{ED}$. The band-pass filter 30 and the band-stop filters 31 and 32 are arranged to be separately tiltable in the reflecting illumination optical path ahead of the dichroic mirror 26.

Since the optical components of the third embodiment are the same as those of the first or second embodiment with the exception of the band-pass filter 30 and the band-stop filters 31 and 32, reference numerals identical with those of the first or second embodiment (FIG. 1 or 4) are used in FIG. 7.

Figures 8A, 8B:
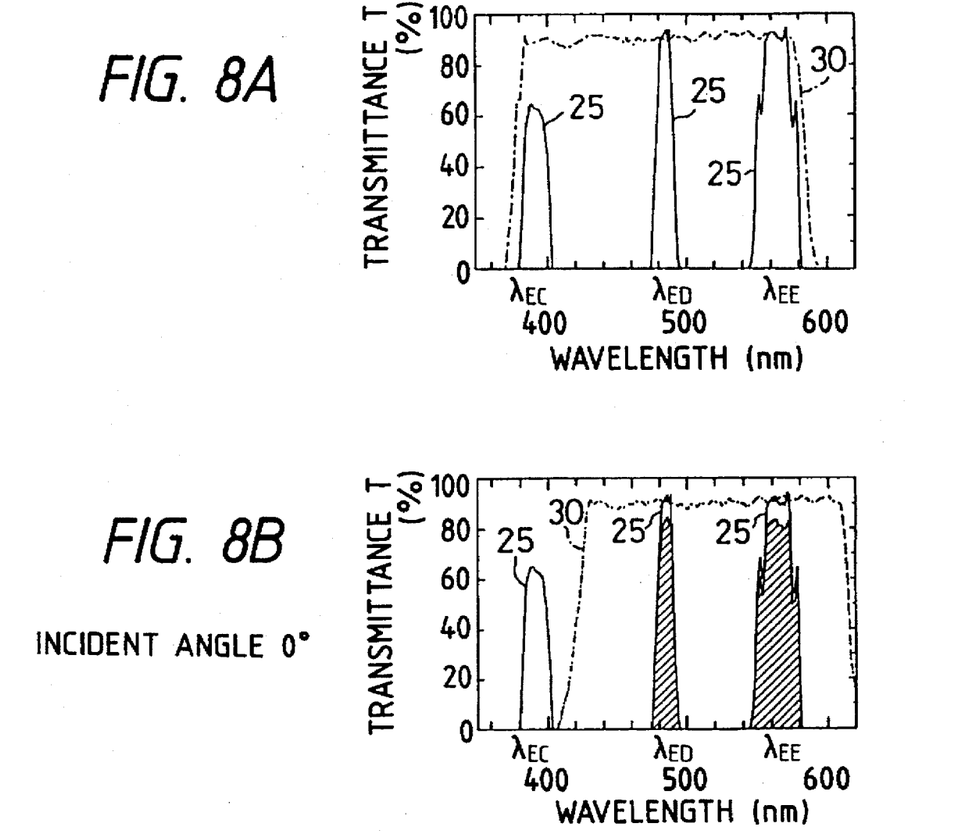
FIGS. 8A, 8B, 8C, 8D, and 8E are graphs showing the relationships between the wavelength and the transmittance in various filters used in the third embodiment.

The band-pass filter 30, which is an interference filter, has characteristics such as those shown in FIG. 8A with respect to the wavelength regions $\lambda_{EC}$, $\lambda_{ED}$, and $\lambda_{EE}$. When the band-pass filter 30 is inclined at 0° or 45° with respect to the reflecting illumination optical path, its characteristics changes as shown in FIG. 8B or 8C.

Figure 8C:
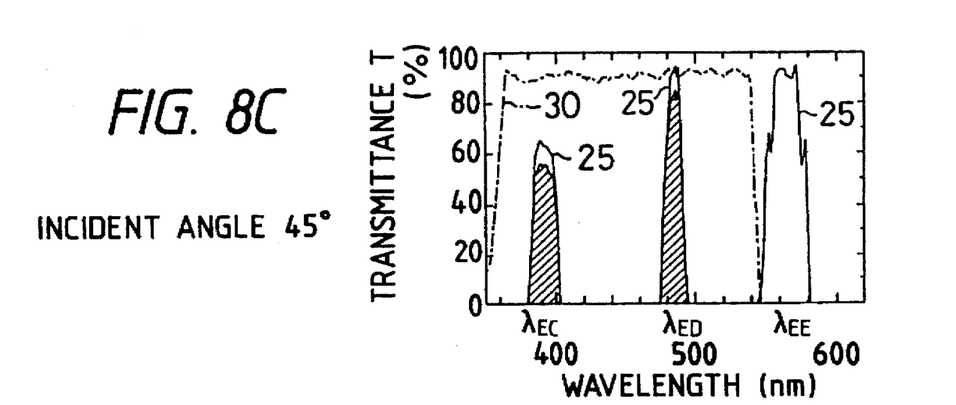

In the third embodiment, where the band-pass filter 30 is used in combination with the triple excitation filter 25, if the band-pass filter 30 is inclined perpendicular to the optical axis (the angle of inclination=0°), the wavelength region of the excitation light becomes the hatching portion shown in FIG. 8B, and if it is inclined at 45°, the wavelength region becomes the hatching portion shown in FIG. 8C. Hence, if the band-pass filter 30 is set at an arbitrary angle between 0° and 45°, the intensity ratio of the excitation light between the wavelength region $\lambda_{EC}$ of narrow-band excitation light on the shortest-wavelength side and the wavelength region $\lambda_{EE}$ of narrow-band excitation light on the longest-wavelength region can be adjusted.

Where it is assumed that the band-stop filter 31 has the absorption band, for example, between the wavelength regions $\lambda_{ED}$ and $\lambda_{EE}$ of the narrow-band excitation light, if the band-stop filter 31 is inclined from 0° to 45° regarding the reflecting illumination optical path, the wavelength region $\lambda_{ED}$ of the narrow-band excitation light and the wavelength region $\lambda_{EE}$ which is a non-transmission region are shifted, and the intensities of the narrow-band excitation light in the wavelength regions $\lambda_{ED}$ and $\lambda_{EE}$ can be adjusted.

Figure 8D:
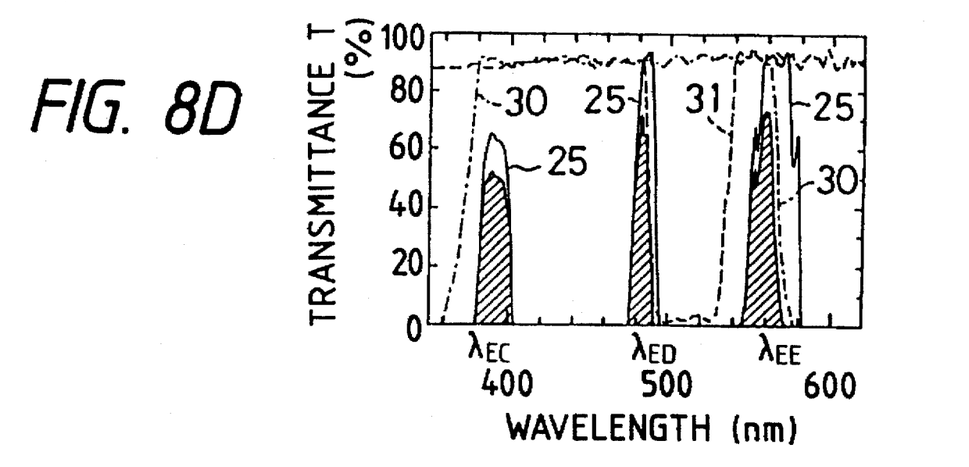

Similarly, when the band-stop filter 32 having the absorption band between the wavelength regions $\lambda_{EC}$ and $\lambda_{ED}$ is inclined from 0° to 45° regarding the reflecting illumination optical path, the absorption band is shifted and the intensities of the narrow-band excitation light in the wavelength regions $\lambda_{EC}$ and $\lambda_{ED}$ can be adjusted. Hence, the band-pass filter 30 and the band-stop filter 31 are separately inclined at arbitrary angles to thereby adjust the intensity ratio among three kinds of excitation light in the wavelength regions $\lambda_{EC}$, $\lambda_{ED}$, and $\lambda_{EE}$, as shown in FIG. 8D. In doing so, the intensity ratio among three kinds of fluorescent light excited by the excitation light can be adjusted, and a desired brightness can be obtained.

The band-pass filter 30 has a high transmittance in the wavelength region $\lambda_{ED}$ of the excitation light, and each of the band-stop filters 31 and 32 has a high transmittance in any region with the exception of regions between the wavelength regions $\lambda_{EC}$ and $\lambda_{ED}$ and between the wavelength regions $\lambda_{ED}$ and $\lambda_{EE}$, and thus the excitation light in the other regions is not blocked. Moreover, the band-pass filter 30 and the band-stop filters 31 and 32 can be removably arranged in the reflecting illumination optical path. Where the intensity ratio of the excitation light need not be adjusted, these filters may be removed from the optical path.

Figure 8E:
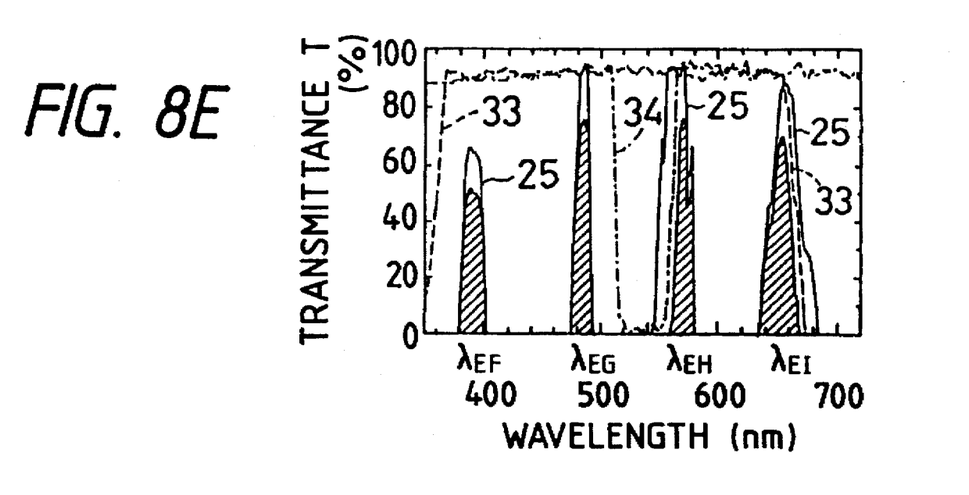

For quadruple excitation, as depicted in FIG. 8E, a band-pass filter 33 having a high transmittance which, of wavelength regions $\lambda_{EF}$, $\lambda_{EG}$, $\lambda_{EH}$, and $\lambda_{EI}$, ranges from the wavelength region $\lambda_{EF}$ of narrow-band excitation light on the shortest-wavelength side to the wavelength region $\lambda_{EI}$ of narrow-band excitation light on the longest-wavelength region, and at least one band-stop filter 34 having the absorption band between the wavelength regions $\lambda_{EG}$ and $\lambda_{EH}$ or at least one band-stop filter having the absorption band between other adjacent wavelength regions are arranged to be separately tiltable in the reflecting illumination optical path, and thereby the intensities of the excitation light can be adjusted as in the case of triple excitation. In addition, the intensity ratio of fluorescent light excited by the excitation light can be adjusted and a desired brightness can be secured.

Likewise, in the case of at least quintuple excitation, a band-pass filter having a high transmittance which ranges from the wavelength region of excitation light on the shortest-wavelength side to the wavelength region of excitation light on the longest-wavelength side and at least one band-stop filter having the absorption band between adjacent wavelength regions of the narrow-band excitation light are arranged to be separately tiltable in the optical path. In this way, the intensity ratio among various kinds of fluorescent light with at least quintuple excitation can be adjusted to secure a desired brightness.

As mentioned above, in the first to third embodiments, the absorption bandwidth and transmittance of the band-stop filter and the amount of change in transmission wavelength shift are set according to the intensity of fluorescent light, and thereby it becomes possible to accommodate the intensities of various kinds of fluorescent light and effectively secure excitation light. Moreover, the intensity ratio of the fluorescent light can easily be adjusted. Similarly, in the third embodiment, the transmission bandwidth and transmittance of the band-pass filter and the amount of change in transmission wavelength shift are set according to the intensity of fluorescent light, and thereby it becomes possible to accommodate various fluorochromes and effectively secure excitation light. Moreover, the intensity ratio of the fluorescent light can easily be adjusted.

Fourth Embodiment

This embodiment, although it is directed to triple excitation, provides a different construction from the above embodiments. An excitation-light adjusting filter 25' having characteristics such as those shown in the following items is provided.

(1) $T_{EC} \leq T_{ED} \leq T_{EE}$ (characteristics shown in FIG. 9A)
(2) $T_{EC} \geq T_{ED} \geq T_{EE}$ (characteristics shown in FIG. 9B)
(3) $T_{EC} \leq T_{ED}$, $T_{ED} \geq T_{EE}$ (characteristics shown in FIG. 9C)
(4) $T_{EC} \geq T_{ED}$, $T_{ED} \leq T_{EE}$ (characteristics shown in FIG. 9D)
where $T_{EC}$, $T_{ED}$, and $T_{EE}$ are transmittances of the excitation-light adjusting filter 25' in the wavelength regions $\lambda_{EC}$, $\lambda_{ED}$, and $\lambda_{EE}$, respectively, of the narrow-band excitation light.

At least one excitation-light adjusting filter 25' having the above characteristics with respect to the wavelength regions $\lambda_{EC}$, $\lambda_{ED}$, and $\lambda_{EE}$ of the narrow-band excitation light of the triple excitation filter 25 is placed in the reflecting illumination optical path ahead of the dichroic mirror 26, and thereby the transmittances of the triple excitation filter 25 in the wavelength regions $\lambda_{EC}$, $\lambda_{ED}$, and $\lambda_{EE}$ can be adjusted.

Figure 9A:
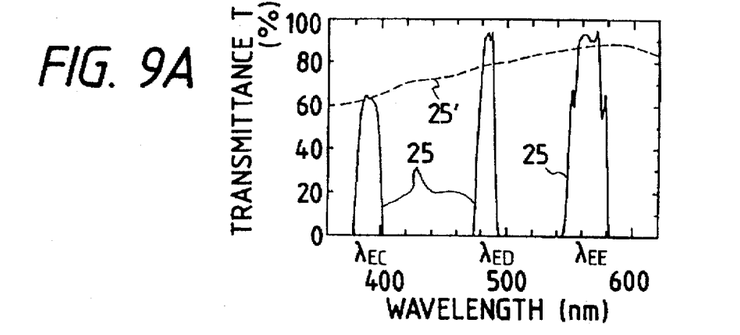
FIGS. 9A, 9B, 9C, and 9D are graphs showing the relationships between the wavelength and the transmittance in an excitation filter and an excitation-light adjusting filter used in a fourth embodiment.
Figure 9B:
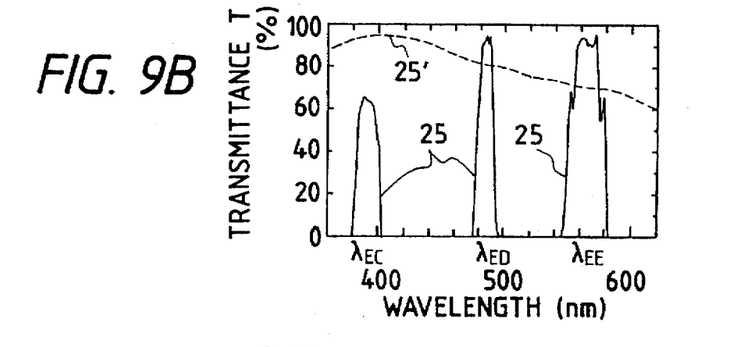
Figure 9C:
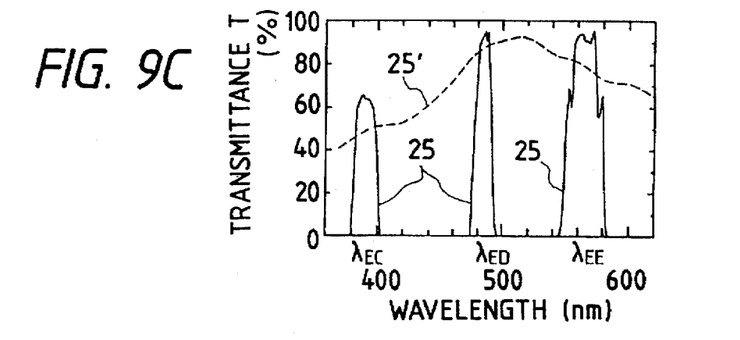
Figure 9D:
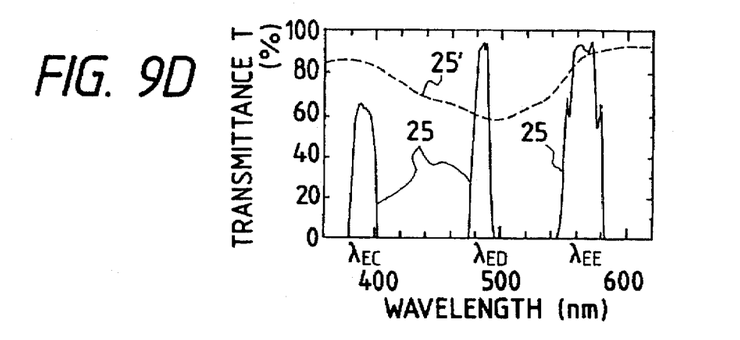
Figure 10A:
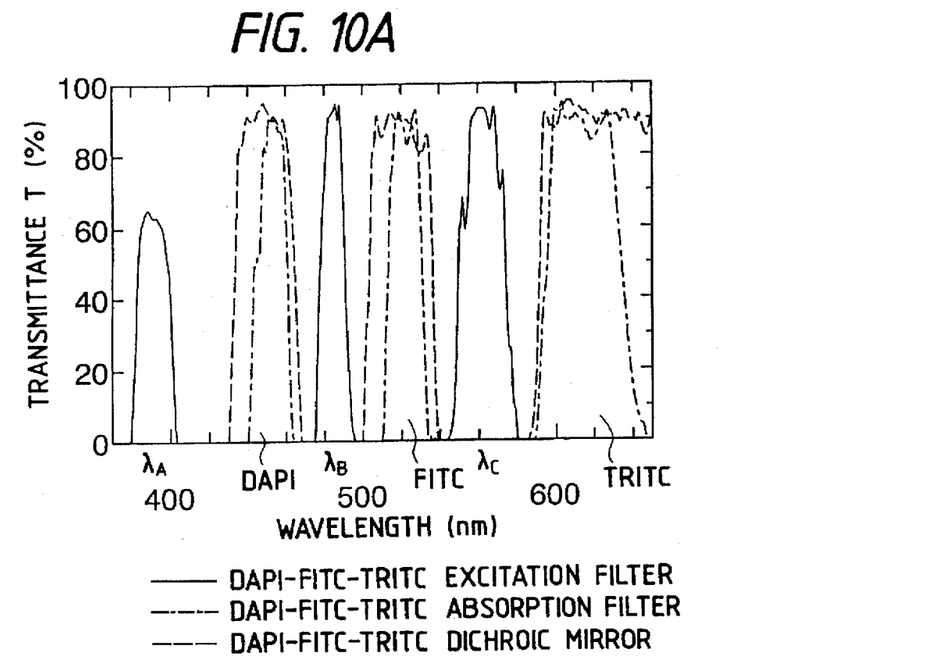
FIGS. 10A and 10B are graphs showing the relationships between the wavelength and the transmittance in fluorescent filters used for fluorochromes.
Figure 10B:
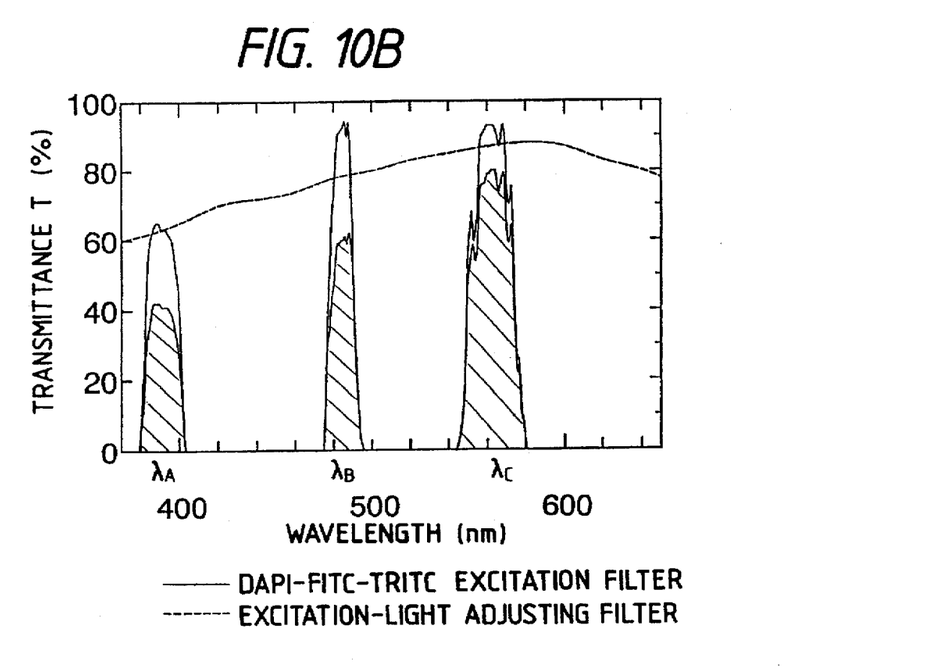

As shown in FIG. 10A, for example, in the triple excitation of the excitation light of a wavelength region $\lambda_A$ for exciting a fluorochrome DAPI by a fluorescent filter set for triple excitation, the excitation light of a wavelength region $\lambda_B$ for exciting a fluorochrome FITC, and the excitation light of a wavelength region $\lambda_C$ for exciting a fluorochrome TRITC, if intensities $\alpha$, $\beta$, and $\tau$ of fluorescent light of the fluorochromes DAPI, FITC, and TRITC are expressed by $\alpha > \beta > \tau$, the excitation-light adjusting filter 25' having characteristics such as those shown in FIG. 9A is placed in the reflecting illumination optical path. In doing so, the intensities of the excitation light are adjusted as in hatching portions shown in FIG. 10B to balance the intensities of various kinds of fluorescent light, so that almost the same brightness can be brought about.

Similarly, various excitation-light adjusting filters are selectively placed in accordance with the brightness of the fluorescent light, and thereby the intensity ratio of the excitation light is adjusted. In this way, the intensity ratio of the fluorescent light effectively excited can be adjusted. Furthermore, by using an excitation-light adjusting filter of various characteristics other than the characteristics of the excitation-light adjusting filter 25' shown in FIGS. 9A–9D, the brightness of the fluorescent light can also be adjusted.

Even in the case of at least quadruple excitation, if at least one of various excitation-light adjusting filters having different transmittances with respect to various kinds of narrow-band excitation light is placed in the reflecting illumination optical path, the intensity ratio among various kinds of fluorescent light can be likewise adjusted.

Also, a combination of the excitation-light adjusting filter with the band-stop filter or the band-pass filter which can be inclined in the reflecting illumination optical path allows a similar adjustment of the intensity ratio among various kinds of fluorescent light emitted from the specimen.

What is claimed is:

1. A reflecting fluorescence microscope comprising:
   an excitation filter for converting a beam of light projected from a reflecting illumination light source into light having wavelength components in a plurality of narrow-band wavelength regions of excitation light;
   a dichroic mirror for irradiating a specimen with the light having wavelength components in the plurality of narrow-band wavelength regions of excitation light converted by said excitation filter and for transmitting various kinds of fluorescent light emitted from the specimen;
   an absorption filter for absorbing wavelength components in an unwanted wavelength region from the light transmitted through said dichroic mirror and for transmitting wavelength components of light with which a fluorescent image is formed; and
   at least one band-stop filter having at least one absorption band, said band-stop filter being disposed in a reflecting illumination optical path before said dichroic mirror for adjusting amounts of wavelength components in the plurality of narrow-band wavelength regions of excitation light by absorbing wavelength components in said absorption band.

2. A reflecting fluorescence microscope according to claim 1, wherein said absorption band of said band-stop filter is arranged between a longest-wavelength-side and a shortest-wavelength-side of the plurality of narrow-band wavelength regions of excitation light.

3. A reflecting fluorescence microscope according to claim 1 or 2, wherein said band-stop filter is an interference filter arranged to be changeable in inclination angle thereof with respect to the reflecting illumination optical path so that said absorption band of said band-stop filter is shiftable in a wavelength range
   from a position where said band-stop filter cuts off or highly attenuates wavelength components in a shorter-wavelength-side of two adjacent wavelength regions among the plurality of narrow-band wavelength regions of excitation light and where said band-stop filter has high transmittances for wavelength components in a longer-wavelength side of the two adjacent narrow-band wavelength regions of excitation light to a position where said band-stop filter has high transmittances for the wavelength components in the shorter-wavelength-side of the two adjacent narrow-band wavelength regions of excitation light and said band-stop filter cuts off or highly attenuates the wavelength components in the longer-wavelength-side of the two adjacent narrow-band wavelength regions of excitation light.

4. A reflecting fluorescence microscope according to claim 3, further comprising a band-pass filter having a transmission band arranged to be between a longest-wavelength-side and a shortest-wavelength-side of the plurality of narrow-band wavelength regions of excitation light, wavelength components in said transmission band being transmitted through said band-pass filter with high transmittances, said band-pass filter being a single interference filter disposed in the reflecting illumination optical path and arranged to be changeable in inclination angle thereof with respect to the reflecting illumination optical path so that said transmission band of said band-pass filter is shiftable in a range from a position where said band-pass filter cuts off wavelength components in the shortest-wavelength-side narrow-band wavelength region of excitation light and has high transmittances for wavelength components in the longest-wavelength-side narrow-band wavelength region of excitation light to a position where said band-pass filter cuts off the wavelength components in the longest-wavelength-side narrow-band wavelength region of excitation light and has high transmittances for the wavelength components in the shortest-wavelength-side narrow-band wavelength region of excitation light.

* * * * *